United States Patent [19]
Hori

[11] Patent Number: 5,608,529
[45] Date of Patent: Mar. 4, 1997

[54] OPTICAL THREE-DIMENSIONAL SHAPE MEASURING APPARATUS

[75] Inventor: Kenji Hori, Tokyo, Japan

[73] Assignee: Nikon Corporation, Tokyo, Japan

[21] Appl. No.: 378,018

[22] Filed: Jan. 25, 1995

[30] Foreign Application Priority Data

Jan. 31, 1994 [JP] Japan .................................. 6-027269
Sep. 29, 1994 [JP] Japan .................................. 6-259057

[51] Int. Cl.⁶ ...................................................... G01B 11/24
[52] U.S. Cl. ...................................................... 356/376
[58] Field of Search .............................. 356/376, 375, 356/372, 373, 371; 250/561, 201.2, 201.6, 201.7, 201.8

[56] References Cited

U.S. PATENT DOCUMENTS 4,585,349  4/1986  Gross et al. ............................ 356/375
4,965,442  10/1990  Girod et al. ............................ 356/376
5,448,360  9/1995  Wakai et al. ............................ 356/376

Primary Examiner—Hoa Q. Pham
Attorney, Agent, or Firm—Shapiro and Shapiro

[57] ABSTRACT

An optical three-dimensional shape measuring apparatus comprising an irradiating optical system for projecting a predetermined patterned image on the surface of a specimen, an observation optical system for observing the patterned image projected on the surface of the specimen and a measuring device for measuring the surface shape of the specimen based on the variation of the observed patterned image, wherein the irradiating optical system includes a focal plane dividing device for forming, along the optical axis thereof, predetermined patterned images respectively on plural focal planes.

14 Claims, 14 Drawing Sheets

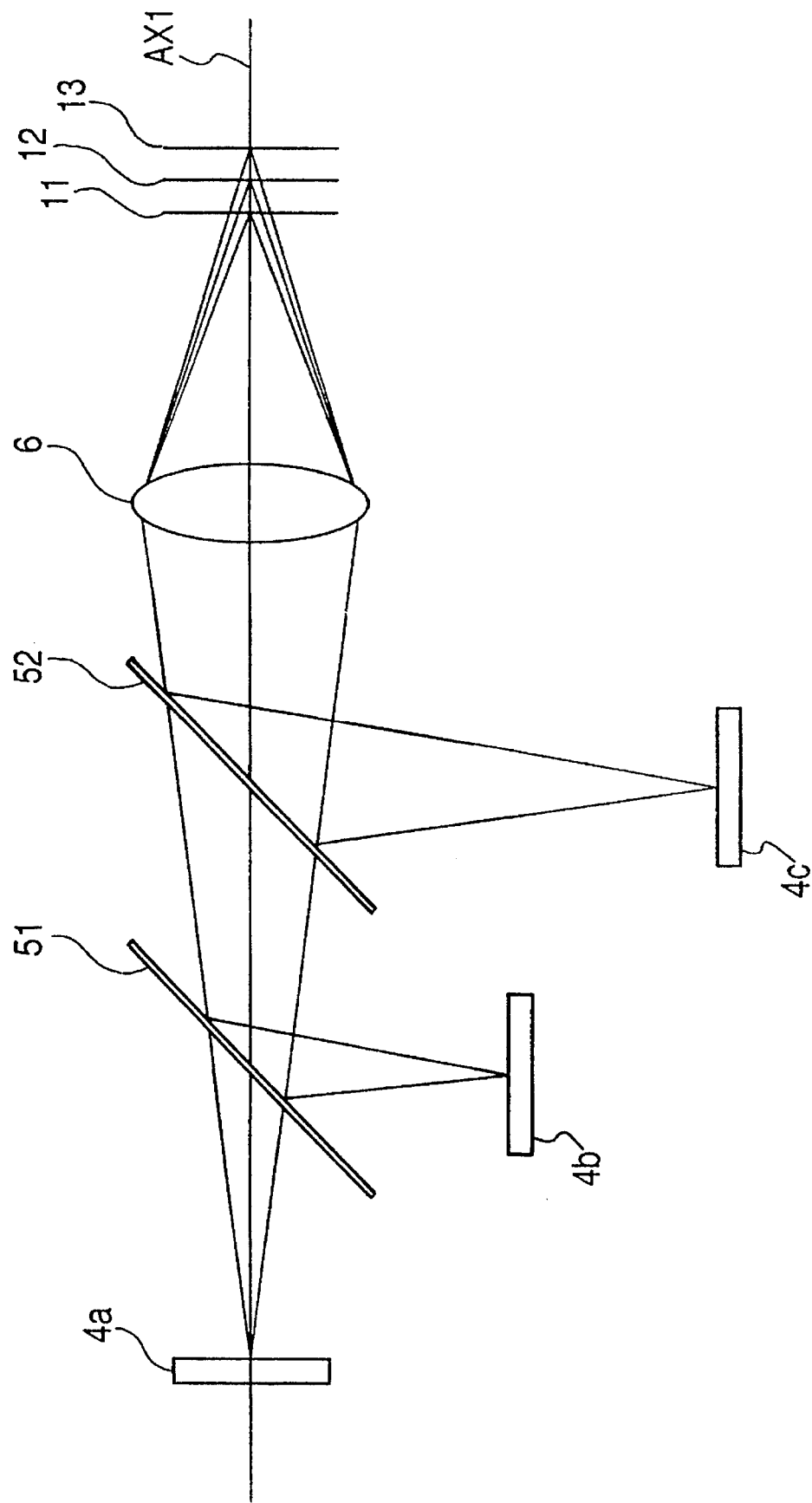

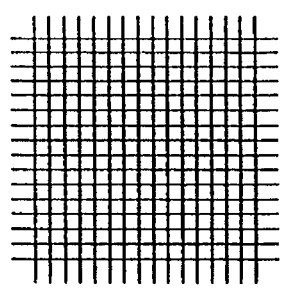
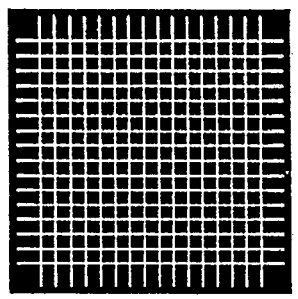
FIG. 11A
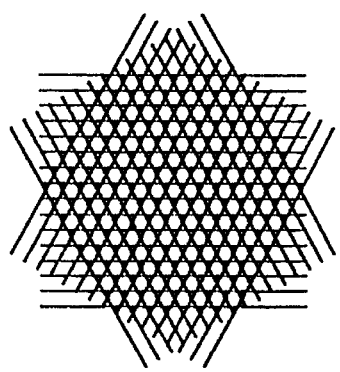
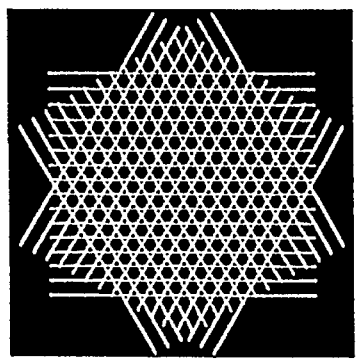
FIG. 11B

OPTICAL THREE-DIMENSIONAL SHAPE MEASURING APPARATUS

BACKGROUND OF THE INVENTION

1. Field of the Invention

The present invention relates to an optical three-dimensional shape measuring apparatus and, more particularly, to such apparatus of pattern irradiation type.

2. Related Background Art

In the conventional optical three-dimensional shape measuring apparatus of the pattern irradiation type, a predetermined pattern is projected, through an irradiating optical system onto the surface of a specimen to be measured, then the projected pattern is observed by an observing optical system, and the surface shape of the specimen is measured, based on the variation of the observed projected pattern. Stated differently, the conventional optical three-dimensional shape measuring apparatus of the pattern irradiation type utilizes non-contact surface measurement based on a pattern projection method.

This method can measure the surface shape of any object, except for an object of which surface reflectivity varies significantly by the incident angle, such as an optical mirror surface (an object generating mostly normally reflected light but little scattered light) or a transparent object scarcely generating reflected (scattered) light.

In the optical measurement mentioned above, the projected pattern has to be made finer, in order to improve the precision of shape measurement, namely to improve the resolving power of the measurement. In general, the extent of condensing of light depends on the numerical aperture (NA) of the optical system, and the projected pattern becomes finer as the numerical aperture increases. However a larger numerical aperture reduces the depth of focus of the optical system.

As explained in the foregoing, in the conventional optical three-dimensional shape measuring apparatus, the depth of focus of the optical system becomes smaller when the surface shape of the specimen is to be measured with a higher precision or a higher resolving power. Consequently if the surface of the specimen is relatively flat (planar), a highly precise shape measurement is possible over the entire projection area (corresponding to the area of observation) of the optical system in a single operation. On the other hand, if the surface of the specimen is irregular, in portions within the projection area of the optical system where the focusing does not reach a desired level, the shape measurement itself becomes impossible, not to speak of the precision thereof.

In the conventional optical three-dimensional shape measuring apparatus, therefore, when measuring the surface shape of a general specimen with an unflat surface with a high precision, it is required to employ an extremely simple irradiation pattern consisting for example of a single spot, and to repeat the measurement while maintaining precise positioning (namely focusing) with the optical system in an extremely narrow area corresponding to such small projection pattern.

SUMMARY OF THE INVENTION

In consideration of the foregoing, an object of the present invention is to provide an optical three-dimensional shape measuring apparatus capable of rapid and highly precise shape measurement over a wide surface area.

The above-mentioned object can be attained, according to the present invention, by an optical three-dimensional shape measuring apparatus provided with an irradiating optical system for projecting a predetermined pattern image onto the surface of a specimen, and an observation optical system for observing the pattern image projected on the surface of said specimen, in which the surfacial shape of said specimen is measured based on the variation of said observed pattern image, wherein said irradiating optical system comprises focal plane dividing means for forming said predetermined pattern images respectively on plural focal planes positioned along the optical axis of said optical system.

In a preferred embodiment of the present invention, said focal plane dividing means is composed of a pair of half mirrors which are positioned mutually substantially parallel with a predetermined distance therebetween and are substantially perpendicular to the optical axis of said irradiating optical system, and which are adapted to divide a pattern light into plural pattern lights. Said paired half mirrors preferably vary the reflectivity depending on the wavelength of the light, or are preferably provided therebetween with light absorbing means for absorbing the light of a specified wavelength with a predetermined proportion.

The focal plane dividing means preferably can be composed of a pair of half mirrors which are mutually opposed with a predetermined distance therebetween and in which one of said half mirrors is substantially perpendicular to the optical axis of said irradiating optical system while the other is slightly inclined from a plane perpendicular to said optical axis, whereby said paired half mirrors are adapted to divide a pattern light into plural pattern lights.

Furthermore said paired half mirrors preferably vary the reflectivity depending on the wavelength of the light, or are preferably provided therebetween with light absorbing means for absorbing the light of a specified wavelength with a predetermined proportion.

The focal plane dividing means is preferably composed of a half mirror positioned in the optical path, wherein the light transmitted by said half mirror forms a first pattern image on a first focal plane while the light reflected by said half mirror forms a second pattern image on a second focal plane.

Said observation optical system preferably has an optical axis crossing, at a predetermined angle, that of said irradiating optical system. In such case, the observation optical system is preferably provided with a first observation optical unit having an optical axis crossing that of said irradiating optical system at a first predetermined angle, and a second observation optical unit having an optical axis crossing that of said irradiating optical system at a second predetermined angle.

The observation optical system preferably has a first observation optical unit having a first optical axis substantially parallel to the optical axis of said irradiating optical system, and a second observation optical unit having a second optical axis substantially parallel to the optical axis of said irradiating optical system, wherein the light receiving means of said first observation optical unit and that of said second observation optical unit are respectively positioned with displacements of predetermined distances from said first and second optical axes.

Furthermore, said observation optical system is preferably provided with division means for dividing the light from said pattern image, and plural light-receiving means for respectively receiving the plural lights divided by said division means. In such case said division means is preferably composed of a half mirror provided in the optical path, and first light-receiving means is adapted to receive the light transmitted by said half mirror while second light-receiving means is adapted to receive the light reflected by said half mirror.

The division means can be composed of a dichroic mirror provided in the optical path, and the first light-receiving means is adapted to receive a first light of a predetermined color divided by said dichroic mirror while the second light-receiving means is adapted to receive a second light of a predetermined color divided by said dichroic mirror. In such case the optical axis of said observation optical system preferably crosses that of said irradiating optical system at a predetermined angle. The optical axis of said observation optical system preferably can be substantially parallel to that of said irradiating optical system and said dichroic mirror is positioned with a displacement of a predetermined distance from the optical axis of said observation optical system.

The optical three-dimensional shape measuring apparatus of the present invention is provided with plural focal planes along the optical axis of the irradiating optical system, and a predetermined pattern image is formed on each focal plane. Stated differently, plural patterns are formed at predetermined distances along the optical axis of the irradiating optical system, so that there can be realized a state equivalent to the formation of a pattern image with a desired focus state and with a predetermined depth of focus along the optical axis of the irradiating optical system. It is therefore rendered possible to avoid the drawback that the depth of focus of the optical system decreases when the resolving power is increased by an increase in the numerical aperture of the irradiating optical system.

Therefore, when the surface of the specimen is not flat but shows significant irregularity, pattern images are formed with a desired focus state over a wide area, in such a manner that there are mixed pattern images of the focal planes respectively closest to the surface portions of the specimen. Consequently the rapid and highly precise shape measurement can be achieved over a wide surface area, in a single measuring operation.

By positioning the optical axis of the observation optical system so as to cross that of the irradiating optical system at a predetermined crossing angle, the surface of the observed specimen, corresponding to the light-receiving means, can be made to cross the focal planes. It is therefore made possible to observe the multiple pattern images, formed with predetermined depths along the optical axis of the irradiating optical system.

BRIEF DESCRIPTION OF THE DRAWINGS

FIG. 5 is a view showing a variation of the irradiating optical system provided with plural pattern plates for forming multiple pattern images on the surface of a specimen;

FIGS. 6A and 6B are views showing the configuration of an optical three-dimensional shape measuring apparatus constituting a second embodiment of the present invention, wherein FIG. 6A is a perspective view and FIG. 6B is a plan view along a plane containing the optical axes of the irradiating optical system and the observation optical system;

FIGS. 11A and 11B are views showing variations of the pattern;

DESCRIPTION OF THE PREFERRED EMBODIMENTS

Now the present invention will be clarified in detail by embodiments thereof shown in the attached drawings.

Figure 1:
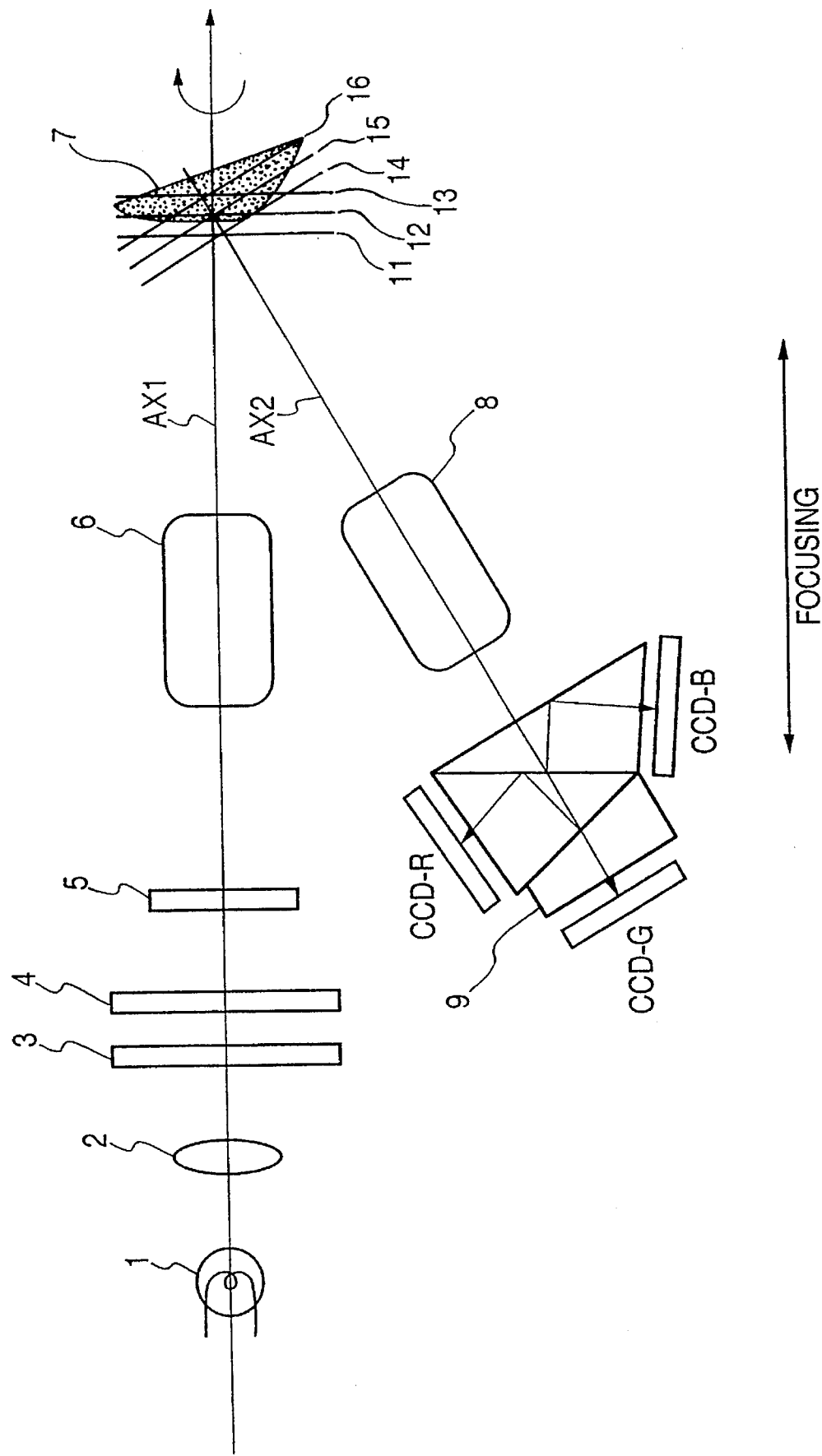
FIG. 1 is a schematic view of the configuration of an optical three-dimensional shape measuring apparatus, constituting a first embodiment of the present invention.

FIG. 1 is a schematic view showing the configuration of an optical three-dimensional shape measuring apparatus constituting a first embodiment of the present invention.

Figure 6A:
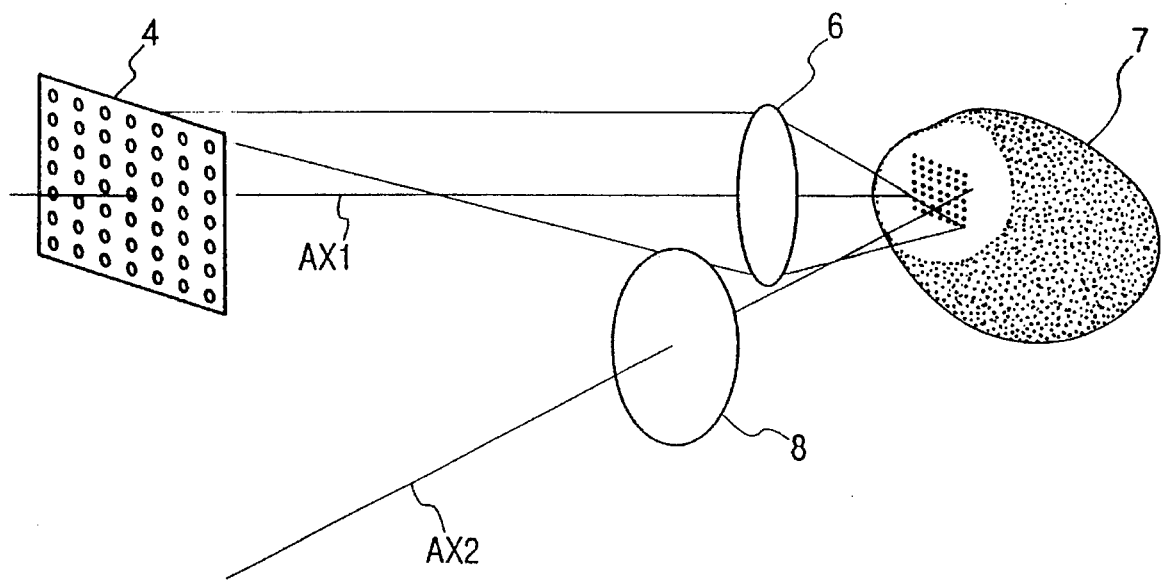

The apparatus shown in FIG. 1 is a provided with a light source such as a strobe light source 1. The irradiating light, emitted from the strobe light source 1 positioned on an optical axis AX1 is converted into a parallel light beam by a collimating lens 2, then converted into light of uniform intensity by a diffusing plate 3 and enters a pattern plate 4. The pattern plate 4 is composed of transparent portions and opaque portions, and the light transmitted by said transparent portions forms a predetermined irradiating pattern. Said pattern can be, for example as shown in FIG. 6A, composed of spots arranged regularly in two mutually orthogonal directions.

Figure 2A:
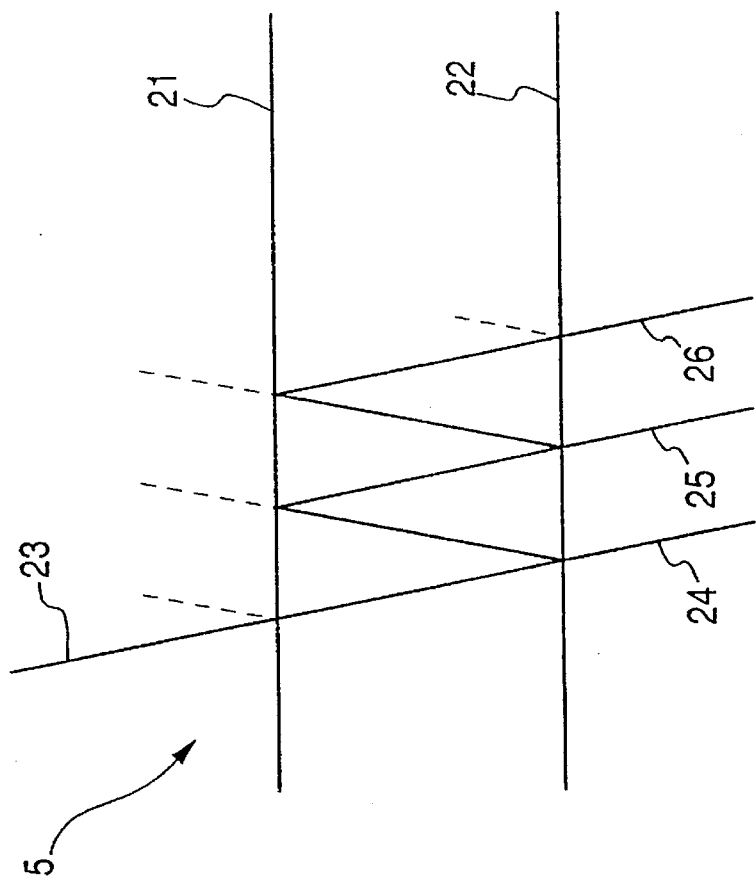
FIGS. 2A and 2B are views showing the structure of a focal plane dividing plate in the apparatus shown in FIG. 1.

The pattern light transmitted by the pattern plate 4 enters a focal plane dividing plate 5, which is composed, as shown in FIG. 2A, of two half mirrors 21, 22 positioned mutually parallel with a predetermined distance therebetween and perpendicular to the optical axis AX1. The half mirrors 21, 22 respectively have predetermined reflectivities.

Figure 2B:
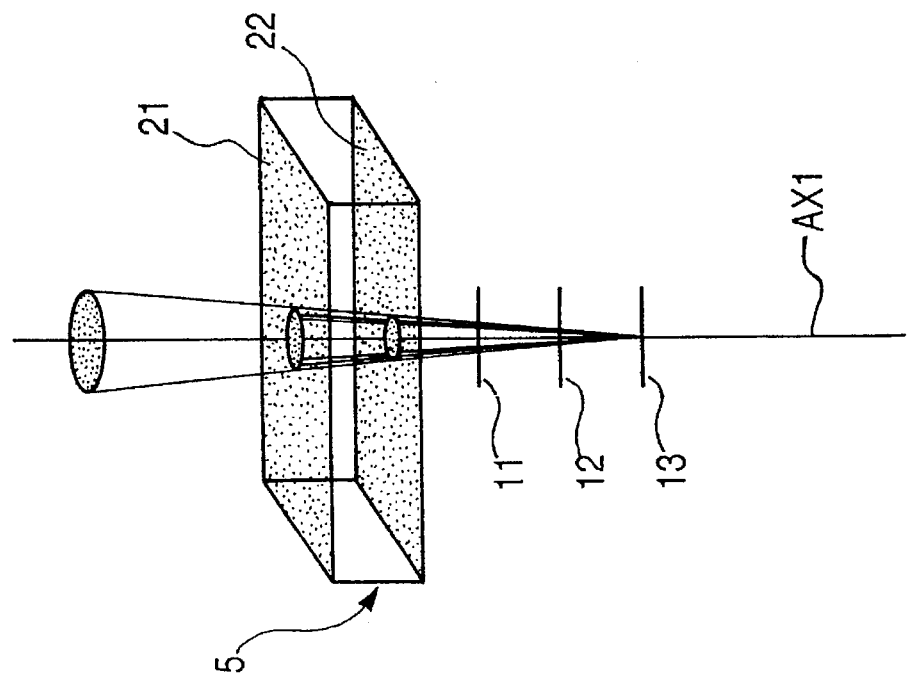

Consequently, as shown in FIG. 2B, the incident light 23 into the focal plane dividing plate 5 is partly transmitted (as indicated by a solid line) by the half mirror 21 while the remaining part is reflected (as indicated by a broken line). The light transmitted by the half mirror 21 is partly transmitted (as indicated by 24) by the half mirror 22, and the remaining part is reflected. The light reflected by the half mirror 22 is partly transmitted (as indicated by a broken line) by the half mirror 21, and the remaining part is reflected (as indicated by a solid line). The light reflected by the half mirror 21 is partly transmitted (as indicated by 25) by the half mirror 22, and the remaining part is reflected. The light reflected again by the half mirror 22 is partly transmitted (as indicated by a broken line) by the half mirror 22, and the remaining part is reflected (as indicated by a solid line). The light reflected again by the half mirror 21 is partly transmitted (as indicated by 26) by the half mirror 22, and the remaining part is reflected. Thereafter the reflection and transmission are repeated at the two half mirrors. In the present embodiment, the present invention will be explained by three divided lights 24, 25 and 26.

If the half mirrors 21, 22 have a reflectivity of 80%, the amount of the light 24, transmitted without reflection by the half mirrors, is 4% of the incident light 23. Also the amount of the light 25, reflected twice by the half mirrors, is 2.56% of the incident light 23. Likewise the amount of the light 26, reflected four times by the half mirrors, is 1.64% of the incident light 23.

The patterned lights 24–26, divided by the focal plane dividing plate 5, are condensed toward the specimen 7 to be measured, by an irradiating objective lens 6, of which numerical aperture NA is determined according to the desired measuring resolving power.

Consequently the pattern lights are focused respectively on three focal planes 11, 12, 13 which are mutually parallel and are perpendicular to the optical axis AX1. As will be apparent from FIG. 2A, a first patterned image corresponding to the light 24, transmitted without reflection by the half mirrors, is formed on a first focal plane 13. A second patterned image, corresponding to the light 25, reflected twice by the half mirrors, is formed on a second focal plane 12, and a third patterned image, corresponding to the light 26, reflected four times by the half mirrors, is formed on a third focal plane 11.

The light source 1, collimating lens 2, diffusing plate 3, pattern plate 4, focal plane dividing plate 5 and irradiating objective lens 6 are all positioned on the optical axis AX1 and constitute the irradiating optical system.

The apparatus shown in FIG. 1 is also provided with an observation optical system having an optical axis AX2, crossing the optical axis AX1 of the irradiating optical system at a predetermined angle. Said observation optical system, for observing the three patterned images, projected on the surface of the specimen 7, is provided with an observation objective lens 8 for condensing the lights from the projected patterned images, and the lights transmitted by said observation objective lens 8 enter three CCD's constituting the light-receiving means, through a dichroic mirror 9.

The observation objective lens 8 has optical characteristics substantially the same as those of the irradiating objective lens 6, and has a numerical aperture NA determined according to the desired measuring resolving power. Among the light entering the dichroic mirror 9, a red light component, a green light component and a blue light component are respectively received by a CCD-R, a CCD-G and a CCD-B. Thus, three CCD's constitute three mutually independent observation image planes, and there exist three observation object planes 14, 15, 16 which are mutually parallel and are perpendicular to the optical axis AX2, respectively corresponding to said three observation image planes CCD-R, CCD-G and CCD-B.

Consequently, it is possible to observe, with a desired resolving power, a patterned image formed in a position corresponding to the observation object plane 14, 15 or 16 (or position within a predetermined depth of focus around the observation object plane) on the surface of the specimen 7. The projection areas indicated by the three focal planes 11, 12, 13 and the observation areas indicated by the three observation object planes 14, 15, 16 are so positioned that they mutually overlap sufficiently.

The observation objective lens 8, dichroic mirror 9 and three CCD's are all positioned on the optical axis AX2 and constitute the observation optical system.

In the following there will be explained the function of the optical three-dimensional shape measuring apparatus as illustrated in FIG. 1.

The light emitted from the light source 1 enters the pattern plate 4 through the collimating lens 2 and the diffusing plate 3. The patterned light transmitted by the pattern plate 4 is divided by the focal plane dividing plate 5, and condensed by the irradiating objective lens 6 to form three patterned images, respectively on the first, second and third focal planes 13, 12, 11 as explained in the foregoing.

The entire apparatus (irradiating optical system and observation optical system) is so positioned, with respect to the specimen 7, that a patterned image is formed with a desired focus state on the surface area to be measured of the specimen 7. More specifically, after the optical axis AX1 of the irradiating optical system is aligned with the specimen 7, the entire optical system is moved with respect to the surface of the specimen 7 as indicated by an arrow to achieve focusing.

Thus, even if the surface of the specimen is not flat but shows significant irregularity, patterned images are formed with a desired focus state over a wide area, in such a manner that the patterned images of different focal planes respectively closest to portions of the surface of the specimen are mixedly present. In general, on the surface area to be measured of the specimen 7, three patterned images are projected in such a superimposed manner that an area where the first patterned image is formed with a desired focus state, an area where the second patterned image is formed with a desired focus state and an area where the third patterned image is formed with a desired focus state are mixed, so that a patterned image showing a desired focus state can be formed over a considerably wide area even when the surface to be measured is not flat.

The observation optical system can observe, with a desired resolving power, the pattern images formed in positions corresponding to the three observation object planes 14, 15, 16 as explained above. More specifically, among the pattern images formed by the irradiating optical system with the desired focus state on the surface of the specimen 7, those of a wide area formed in positions corresponding to the three observation object planes 14, 15, 16 can be observed with a high resolving power respectively through the CCD-R, CCD-G and CCD-B. The inclined positioning of the three observation object planes 14, 15, 16 with respect to the optical axis AX1 is advantageous for the observation of the pattern images covering a wide area.

The method of determining the surface shape of the observed area, based on the deformation of the observed patterned image, is already well known as the projected pattern method, and will not, therefore, be explained in detail.

It is thus possible to precisely and promptly measure the surface shape of substantially the entire surface of the specimen 7, by repeating the above-explained measuring operation while suitably rotating the specimen 7.

Figure 3:
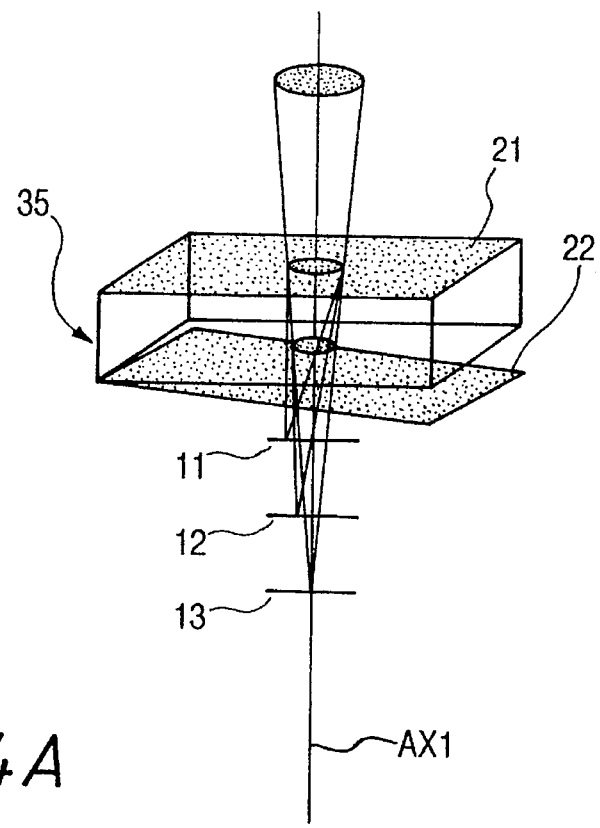
FIG. 3 is a view showing a variation of the focal plane dividing plate.

FIG. 3 shows a variation of the focal plane dividing plate. The focal plane dividing plate 35 shown in FIG. 3 is same as that shown in FIGS. 2A and 2B in that there are provided mutually opposed two half mirrors, but is basically different from the latter in that the second half mirror 2 is slightly inclined from a plane perpendicular to the optical axis AX1 though the first half mirror 21 is positioned perpendicularly to the optical axis AX1.

Consequently a light transmitted by the focal plane dividing plate 35 shown in FIG. 3, without reflection therein, is focused by the irradiating objective lens 6 on a first focal plane 13 perpendicular to the optical axis AX1. Also a light reflected twice in the focal plane dividing plate 35 is focused on a second focal plane 12, slightly inclined from a plane perpendicular to the optical axis AX1 and displaced by a predetermined distance from the optical axis AX1. Also a light reflected four times in the focal plane dividing plate 35 is focused on a third focal plane 11, inclined more from the plane perpendicular to the optical axis AX1 and displaced further by a predetermined distance from the optical axis AX1.

In this manner, the focal plane dividing plate 35 shown in FIG. 3 facilitates distinction from the neighboring pattern images, by the inclinations and relative positional displacements of the pattern images on said three focal planes.

Figure 4A:
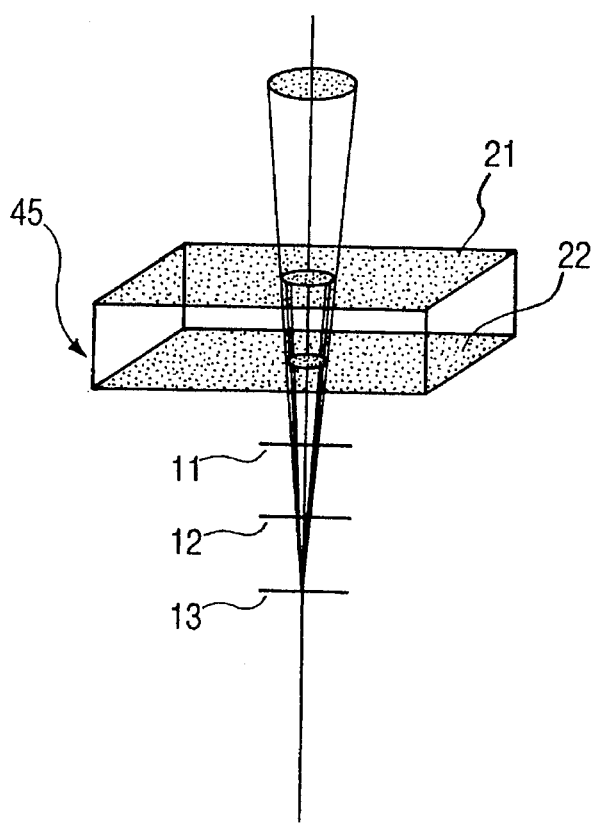
FIG. 4A is a view showing another variation of the focal plane dividing plate.
Figure 4B:
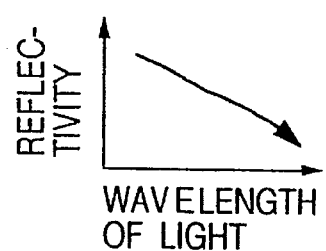
FIG. 4B is a chart showing the relationship between the reflectivity of a half mirror and the wavelength of light.

FIG. 4A shows another variation of the focal plane dividing plate that has a member comprising two half mirrors 21, 22 per se or, as later detailed, two half mirrors and an associated filter. The focal plane dividing plate 45 shown in FIG. 4A is composed of two half mirrors 21, 22 positioned in a mutually parallel manner with a predetermined distance therebetween and perpendicularly to the optical axis AX1, and is therefore same, in the external appearance, as the focal plane dividing plate 5 in FIGS. 2A and 2B. It is however basically different from the latter in that, as shown in FIG. 4B, the reflectivities of the half mirrors 21, 22 are variable depending on the wavelength of the light.

Consequently a first patterned image focused on a first focal plane 13 without reflection in the focal plane dividing plate 45, a second patterned image focused on a second focal plane 12 after two reflections in the focal plane dividing plate 45, and a third patterned image focused on a third focal plane 11 after four reflections in the focal plane dividing plate 45 are mutually different in the spectral transmittances. Stated differently, these patterned images are different in their apparent hues.

Thus the focal plane dividing plate 45 shown in FIG. 4A facilitates distinction from the neighboring patterned images, by the variation in the spectral transmittance among the patterned images on the three focal planes.

Even if the half mirrors 21, 22 lack the variation in reflectivity depending on the wavelength of the light, a similar effect can be achieved by providing an absorbing member (filter), capable of absorbing a predetermined proportion of the light of a specified wavelength between the two half mirrors. In such case, the first, second and third patterned images formed respectively after passing the absorbing member once, three times and five times are mutually different in the spectral transmittance, whereby the distinction from the neighboring patterned images can be facilitated.

FIG. 5 shows a variation of the irradiating optical system, wherein plural pattern plates are provided for forming multiple patterned images on the surface of the specimen. FIG. 5 only illustrates the characteristic components, among which the components equivalent in function to those in the first embodiment shown in FIG. 1 are represented by same numbers.

The irradiating optical system shown in FIG. 5 is provided with three pattern plates 4a, 4b, 4c and two half mirrors 51, 52 positioned in the optical path. The light from an unrepresented first light source is transmitted by a first pattern plate 4a and the two half mirrors 51, 52 provided in the optical path, and enters the irradiating objective lens 6. Also the lights from unrepresented second and third light sources are respectively transmitted by second and third pattern plates 4b, 4c and reflected to the right, by the first and second half mirrors 51, 52, thus entering the irradiating objective lens 6.

Thus the light from the first pattern plate 4a forms a first patterned image on the first focal plane 13. Also the light from the second pattern plate 4b forms a second patterned image on the second focal plane 12, and the light from the third pattern plate 4c forms a third patterned image on the third focal plane 11. The first, second and third focal planes 13, 12, 11 are perpendicular to the optical axis AX1 and are mutually separated by predetermined distances.

Figure 6B:
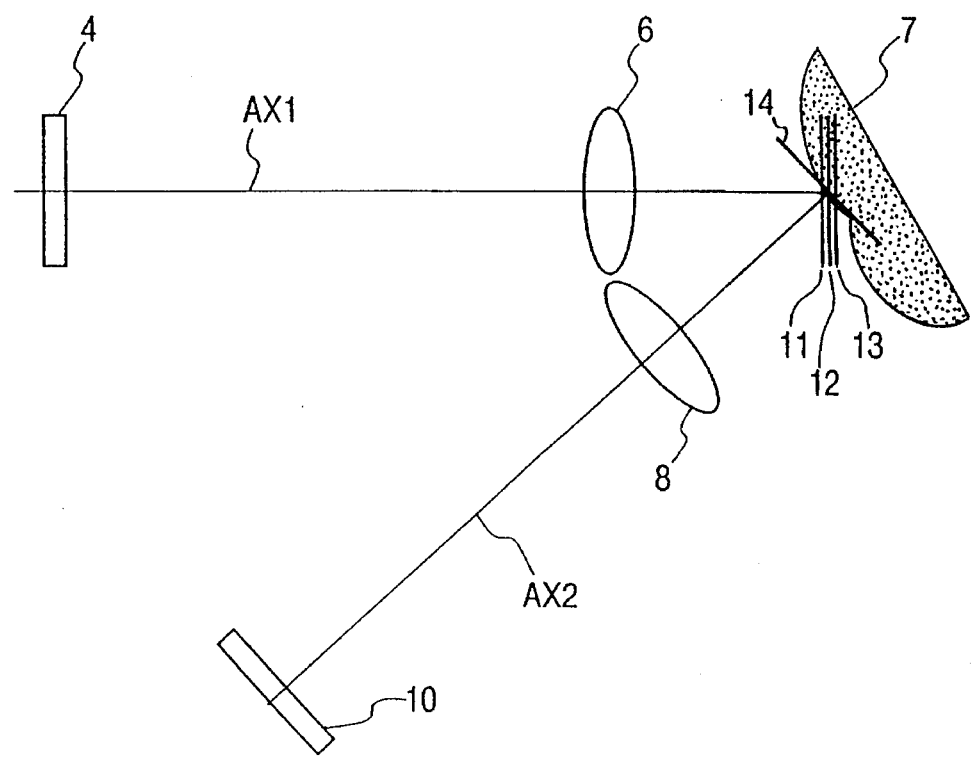

FIGS. 6A and 6B show the configuration of an optical three-dimensional shape measuring apparatus constituting a second embodiment of the present invention, wherein FIG. 6A is a perspective view and FIG. 6B is a plan view along a plane containing the optical axes of the irradiating optical system and the observation optical system. FIGS. 6A and 6B illustrate only the characteristic components within the apparatus of the first embodiment shown in FIG. 1, wherein components equivalent in function to those in the first embodiment are represented by same numbers.

The apparatus of the first embodiment shown in FIG. 1 and that of the present embodiment shown in FIGS. 6A and 6B are basically different in that the apparatus of the present embodiment has only one light-receiving means and only one observation object plane for the observation optical system, while, in the apparatus of the first embodiment, the observation optical system has three light-receiving means and three corresponding observation object planes. The light-receiving means 10 is composed, for example, of a light-receiving optical element such as a CCD.

Also in this embodiment, as in the first embodiment, three patterned images are respectively formed on the first, second and third focal planes 13, 12, 11 in the surface area to be measured of the specimen 7, so that there can be obtained multiple patterned images having a desired focus state over a certain wide area even if the surface area to be measured is not flat. On the other hand, the observation optical system has an optical axis AX2 crossing the optical axis AX1 of the irradiating optical system at a predetermined angle, so that the observation object plane 14 corresponding to the light-receiving means 10 is formed so as to cross said three focal planes 11, 12, 13. Consequently there can be observed, by the CCD 10 in a wider area, the patterned images formed in a superimposed manner with predetermined depths along the optical axis AX1 of the irradiating optical system.

Figure 7A:
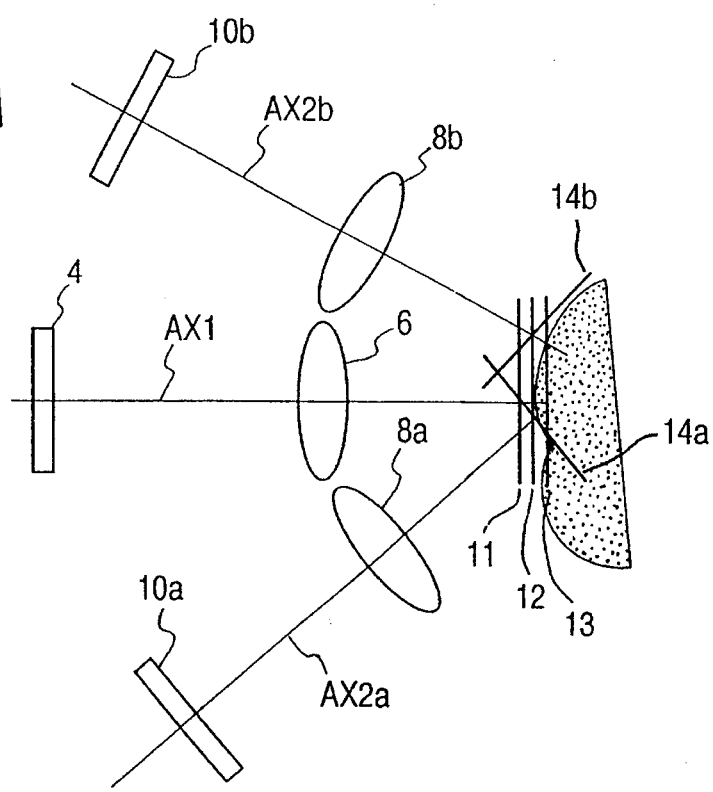
FIGS. 7A and 7B are views showing the configuration of an optical three-dimensional shape measuring apparatus constituting a third embodiment of the present invention.
Figure 7B:
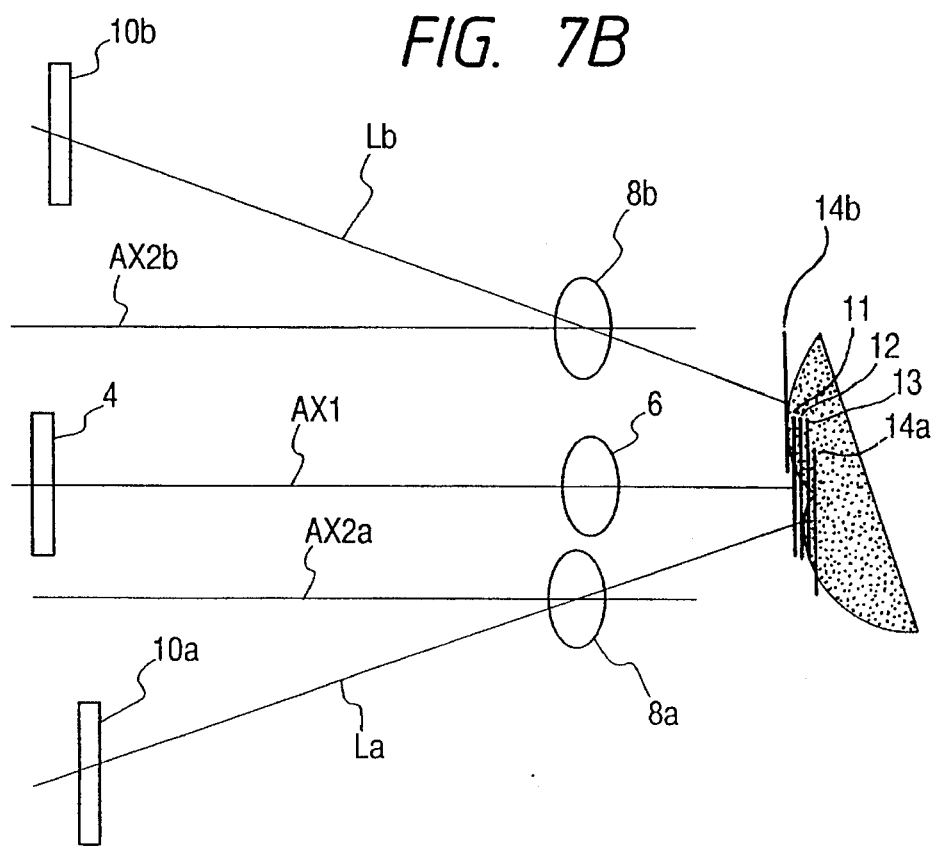

FIGS. 7A and 7B illustrate the configuration of an optical three-dimensional shape measuring apparatus constituting a third embodiment of the present invention. The apparatus of the present embodiment is basically different from those of the foregoing two embodiments, in that there are provided two observation optical systems. FIGS. 7A and 7B only show the characteristic components of the second embodiment in FIGS. 6A and 6B, wherein components equivalent in function to those in the second embodiment are represented by the same numbers.

The apparatus shown in FIG. 7A is provided with a first observation optical system having a first optical axis AX2a crossing the optical axis AX1 of the irradiating optical system at a first predetermined angle, and a second observation optical system having a second optical axis AX2b crossing the optical axis AX1 of the irradiating optical system at a second predetermined angle. Thus, in the apparatus shown in FIG. 7A, there are formed two observation object planes 14a, 14b, respectively corresponding to light-receiving means 10a, 10b such as CCD's, positioned on the optical axes AX2a, AX2b. The observation object planes 14a, 14b are respectively perpendicular to the optical axes AX2a, AX2b.

Thus the patterned images, projected in superimposed manner on the surface of the specimen 7, can be observed from two angles. Consequently the measurement can be made over a wide area even on an extremely irregular surface, since a surface area that cannot be observed by one observation optical system can be observed by the other optical system. Also when the patterned images on a same surface area can be observed at the same time by the two observation optical systems, it is made possible to achieve a high precision in measurement, for example, by averaging the data of the observed patterned images. The number of observation optical systems is not limited to two, but there can be employed a larger number of observation optical systems.

In the apparatus shown in FIG. 7B, the optical axes AX2a, AX2b of the two observation optical systems are substantially parallel to the optical axis AX1 of the irradiating optical system, but the light-receiving means 10a, 10b are not positioned on said optical axes AX2a, AX2b. Consequently two observation object planes 14a, 14b are respectively formed on center lines La, Lb, passing through the centers of the light-receiving means 10a, 10b and those of the observation objective lenses 8a, 8b. Said observation object planes 14a, 14b are respectively perpendicular to the optical axes AX2a, AX2b.

Thus, in the configuration shown in FIG. 7A, the patterned images projected in a superimposed manner on the surface of the specimen 7 can be observed from two angles. Thus there can be achieved observation over a wide area by complementary observation and with a high precision by an averaging process.

Figure 8:
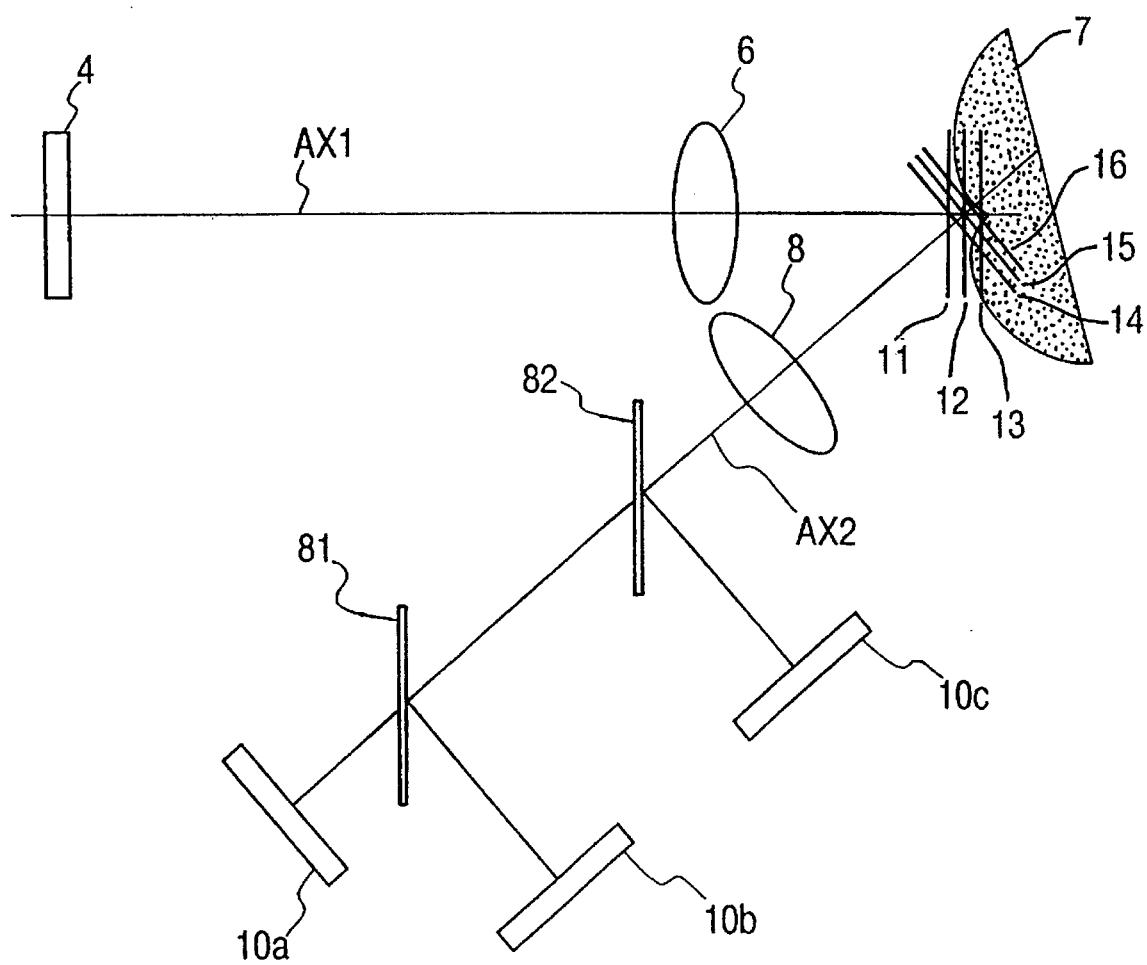
FIG. 8 is a view showing the configuration of an optical three-dimensional shape measuring apparatus constituting a fourth embodiment of the present invention.

FIG. 8 illustrates the configuration of an optical three-dimensional shape measuring apparatus, constituting a fourth embodiment of the present invention. The apparatus of the fourth embodiment is similar to that of the first embodiment, but is basically different from the latter in the method of amplitude division in the observation optical system.

The observation optical system shown in FIG. 8 is provided with two half mirrors 81, 82 provided in the optical path, and, among the lights coming from the three patterned images projected on the surface of the specimen 7, the light transmitted by the observation objective lens 8 and the two half mirrors 81, 82 is received by a CCD 10a constituting first light-receiving means, while the light transmitted by said objective lens 8 and the half mirror 82 and reflected by the half mirror 81 is received by a CCD 10b constituting second light-receiving means. Also the light transmitted by said objective lens 8 and reflected by the half mirror 82 is received by a CCD 10c constituting third light-receiving means.

Consequently there are formed three observation object planes 14, 15, 16 respectively corresponding to the CCD's 10a, 10b, 10c, constituting three observation image planes. Said three observation object planes 14, 15, 16 are perpendicular to the optical axis AX2 and are mutually separated by predetermined distances. This configuration provides effects substantially same as those in the first embodiment.

Figure 9A:
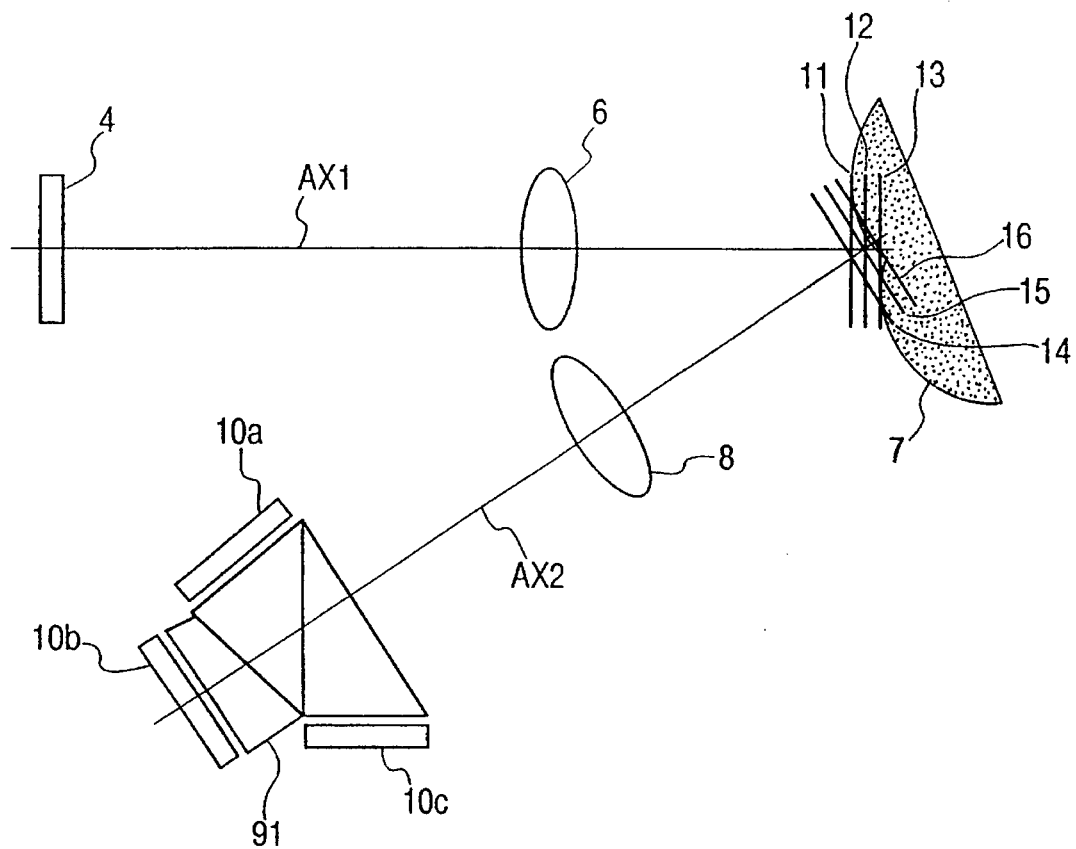
FIGS. 9A and 9B are views showing the configuration of an optical three-dimensional shape measuring apparatus constituting a fifth embodiment of the present invention.
Figure 9B:
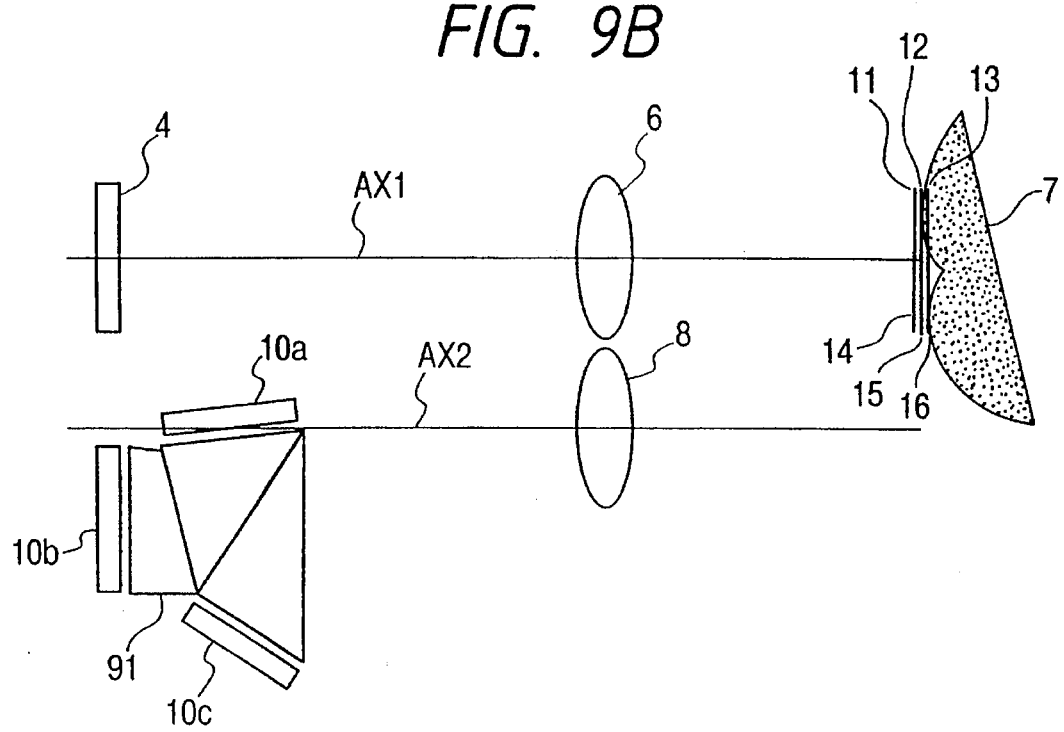

FIGS. 9A and 9B illustrate the configuration of an optical three-dimensional shape measuring apparatus, constituting a fifth embodiment of the present invention, wherein FIG. 9A shows an apparatus in which the optical axis AX1 of the irradiating optical system and that AX2 of the observation optical system mutually cross at a predetermined angle, while FIG. 9B shows an apparatus in which said optical axes are mutually parallel. The apparatus in FIG. 9A is similar in configuration to that of the first embodiment, but is basically different therefrom in that the dichroic mirrors are replaced by a half mirror prism.

In the observation optical system shown in FIG. 9A, the light from the patterned images projected on the surface of the specimen 7 is divided into three by the half mirror prism 91, and enter CCD's 10a, 10b, 10c constituting the light-receiving means.

Thus there are formed three observation object planes 14, 15, 16, respectively corresponding to the CCD's 10a, 10b, 10c constituting the three observation image planes. Said three observation object planes 14, 15, 16 are perpendicular to the optical axis AX2 and are mutually separated by predetermined distances. Thus this configuration provides effects comparable to those in the first embodiment.

The observation optical system shown in FIG. 9B is basically different from that in FIG. 9A in that the optical axis AX2 is parallel to the optical axis AX1 of the irradiating optical system. Also in this case there are formed three observation image planes 14, 15, 16 respectively corresponding to the CCD's 10a, 10b, 10c constituting three observation image planes. Said three observation object planes 14, 15, 16 are perpendicular to the optical axis AX2 of the observation optical system and mutually separated by predetermined distances, and the light-receiving means is displaced from the optical axis AX2 in such a manner that said observation object planes are in a position substantially the same as that of the three patterned images. Consequently the apparatus shown in FIG. 9B evidently provides effects comparable to those of the apparatus shown in FIG. 9A.

Figure 10B:
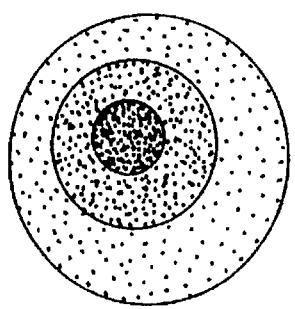
FIGS. 10A to 10C are views showing pattern images projected on three focal planes and superposition of patterns observed respectively from the pattern images.
Figure 10C:
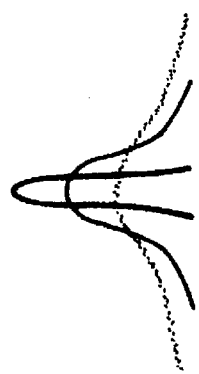
Figure 10A:
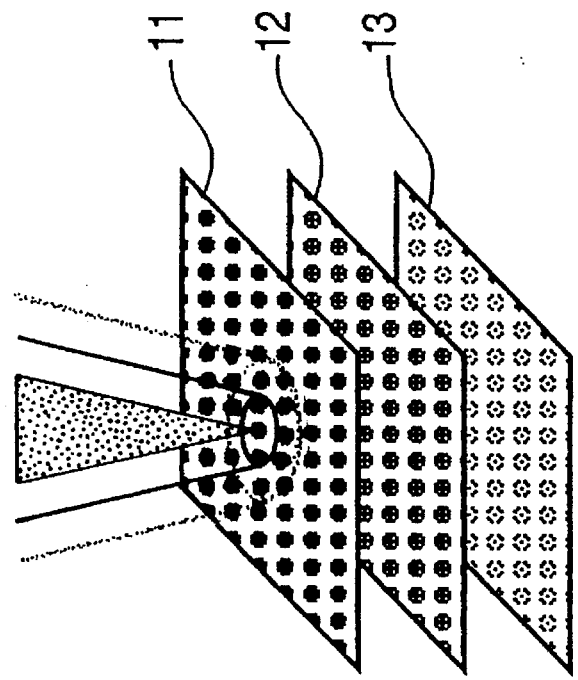

FIGS. 10A to 10C show the state of the patterned images projected onto the three focal planes and the superposition of the patterns respectively observed from said patterned images.

In the optical three-dimensional shape measuring apparatus of the foregoing embodiments, as shown in FIG. 10A, the patterned images, each composed of spots arranged regularly in two orthogonal directions, are formed on the three focal planes 11, 12, 13. In a mutually corresponding area within the spot images formed on said focal planes, the three spots corresponding to said focal planes are observed in mutually superimposed manner as shown in FIG. 10B. FIG. 10C shows the light intensity distributions corresponding to said spots.

Referring to FIG. 10B, the smallest observed spot corresponds to the spot on a focal plane closest to the surface of the specimen, while the largest observed spot corresponds to the spot on a focal plane farthest from said surface. Since the distances of the focal planes and the projected pattern are specific to each apparatus, the mutual positional relationship of the observed spots corresponding to the focal plane or the superimposed pattern indicates the positional relationship between the focal planes and the surface of the specimen, namely between the focal planes and the specimen itself.

Since the positional relationship, for example distance, between the apparatus and the specimen can be measured from the state of the superimposed patterns, there can be achieved focusing based on thus measured distance. In such case it is desirable to construct the patterned images, on respective focal planes, in a mutually distinguishable manner, as shown in FIGS. 4A and 4B.

In the foregoing embodiments there has been explained a spot pattern arranged regularly in two orthogonal directions, but there may also be projected a grating pattern crossing in two orthogonal directions as shown in FIG. 11A or crossing in three directions as shown in FIG. 11B. It is also preferable to select the pattern of projection according to the entire shape of the specimen, for example a rotationally symmetrical pattern if the specimen is rotationally symmetrical, or a striped pattern if the specimen has striped irregularity.

Also in the foregoing embodiments the irradiating optical system has three focal planes, but the number of the focal planes is not limited to three and can be any plural number (2 or larger).

In the optical three-dimensional shape measuring apparatus of the present invention, as explained in the foregoing, plural patterns are formed at predetermined distances along the optical axis of the irradiating optical system, so that there can be realized a state equivalent to the formation of a patterned image with a desired focus state and over a predetermined depth of focus along the optical axis of the irradiating optical system. Consequently, when the resolving power is improved by an increase in the numerical aperture of the irradiating optical system, it is rendered possible to avoid the drawback of decrease in the depth of focus of the optical system and to achieve rapid and precise measurement of the shape over a wide surface area.

However, in the optical three-dimensional shape measuring apparatus of the foregoing embodiments, the irradiating optical system and the observation optical system are respectively provided with the objective lenses, so that the operating distance (distance along the optical axis from the surface of the object to be observed to the lens face closest to the object) has to be made large in each objective lens, in order to prevent mutual interference of the objective lenses. However, an increase in the operating distance leads directly to a reduction in the numerical aperture (NA). As a result, it has been impossible to obtain a finer projection pattern.

This drawback can be resolved, according to the present invention, by an optical three-dimensional shape measuring apparatus provided with an irradiating optical system for projecting a predetermined patterned image on the surface of the specimen and an observation optical system for observing the projected patterned image, in order to measure the surface shape of said specimen based on the difference between said predetermined patterned image and said observed patterned image;

wherein said irradiating optical system and said observation optical system have a common objective optical system; and said apparatus further comprises wave front dividing means for the pupil plane of said objective optical system, for mutually independently defining an optical path from said irradiating optical system to the surface of said specimen and an optical path from the surface of said specimen to said observation optical system.

In a preferred embodiment, said wave front dividing means is composed of an aperture diaphragm having at least two apertures. In such case, said apertured diaphragm is preferably provided with plural first apertures for defining plural optical paths from plural irradiating optical systems to the surface of said specimen, and said plural irradiating optical systems are preferably adapted to project, through said plural first apertures, mutually different plural patterns or plural patterned lights of mutually different colors, onto the surface of said specimen.

Figure 12:
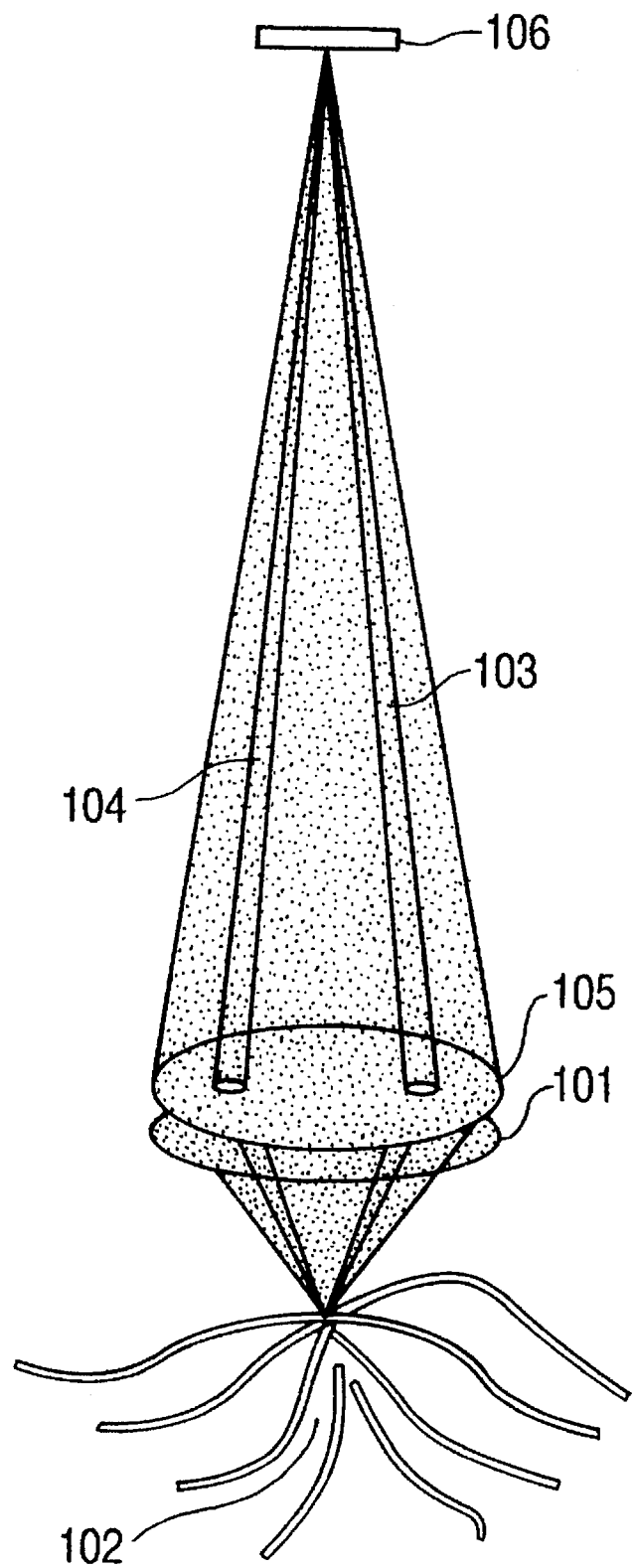
FIG. 12 is a view showing the function of the optical three-dimensional shape measuring apparatus of the present invention.

FIG. 12 is a view showing the function of an optical three-dimensional shape measuring apparatus embodying the present invention.

In the apparatus of the present invention, the irradiating optical system and the observation optical system have a common objective optical system 101, and there is provided an apertured diaphragm 105 as the wave front dividing means for the pupil plane of the objective optical system 101, in order to mutually independently define an optical path 103 from the irradiating optical system to a specimen 102 and an optical path 104 from said specimen 102 to the observation optical system.

In FIG. 12, for the purpose of simplicity, an irradiation pattern face (pattern plate) of the irradiating optical system and the observation image plane of the observation optical system are represented by a common number 106, and the components present between the apertured diaphragm 105 and the pattern face 106 or the image plane 106 are omitted.

Figure 13A:
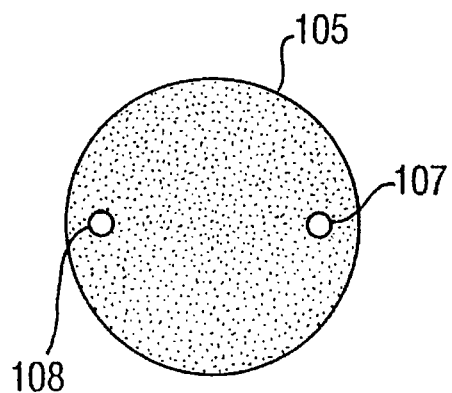
FIGS. 13A to 13C are views showing configurations of an apertured diaphragm in FIG. 12.
Figure 13B:
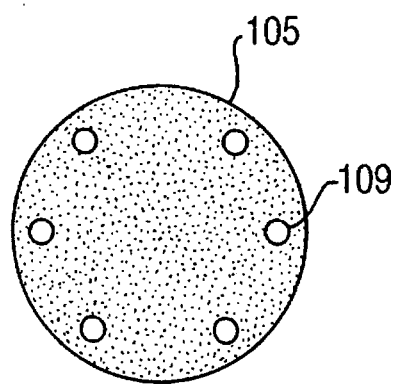
Figure 13C:
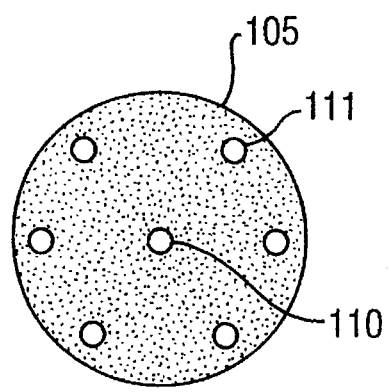

FIGS. 13A to 13C illustrate the configurations of the apertured diaphragm 105 shown in FIGS. 2A and 2B.

As shown in FIGS. 13A to 13C, the apertured diaphragm 105, constituting the wave front dividing means, is provided with at least two apertures. For example, as shown in FIG. 13A, the apertured diaphragm 105 may be provided, along the diameter thereof, with two apertures 107, 108, of which one 107 defines the optical path 103 from the irradiating optical system while the other 108 defines the optical path 104 to the observation optical system.

In the above-explained apparatus of the present invention, the conventional interference of the objective lenses can be avoided since an Objective lens is used in common. Consequently the projected pattern can be made finer by an objective lens of a smaller operating distance, or a larger numerical aperture (NA).

Also the apertured diaphragm 105 may be provided, as shown in FIG. 13B, with six apertures 109 positioned circumferentially. Among these six apertures 109, three define three optical paths 103 from the irradiating optical system while the other three define three optical paths 104 to the observation optical system.

In this case, the patterns may be projected with respectively different irradiating conditions, on the plural optical paths of the irradiating optical system, and the irradiating conditions may be varied, for example, the projected pattern, color of the pattern projecting light, position of formation of the patterned images, or size or shape of the apertures.

It is also possible to observe the patterned images with respectively different observing conditions on the plural optical paths of the observation optical system, and the observing condition may be varied, for example, the focal position, inclination of the observation optical path with respect to the irradiating optical path, size or shape of the aperture, or magnification of the observed image (by presence or absence of a magnification-varying optical system).

Further, as shown in FIG. 13C, the apertured diaphragm 105 may be provided with a central aperture 110 and, for example, six apertures 111 in the peripheral area, wherein the central aperture 110 defines the optical path 103 from the irradiating optical system while the six peripheral apertures 111 define six optical paths to the observation optical system.

In such case the irradiating condition is unique in the optical path of the irradiating optical system, but the observation of the patterned images can be made with respectively different conditions for the plural optical paths in the observation optical system.

The shape measurement can thus be conducted by varying at least one of the irradiation condition and the observing condition, so that effective data of measurement can be securely collected despite various local changes in the shape in the observed area of the specimen. As a result, it is rendered possible to reduce the entire measuring time for the specimen and to achieve rapid and precise shape measurement over a wide surface area.

Now there will be explained a sixth embodiment of the present invention.

Figure 14:
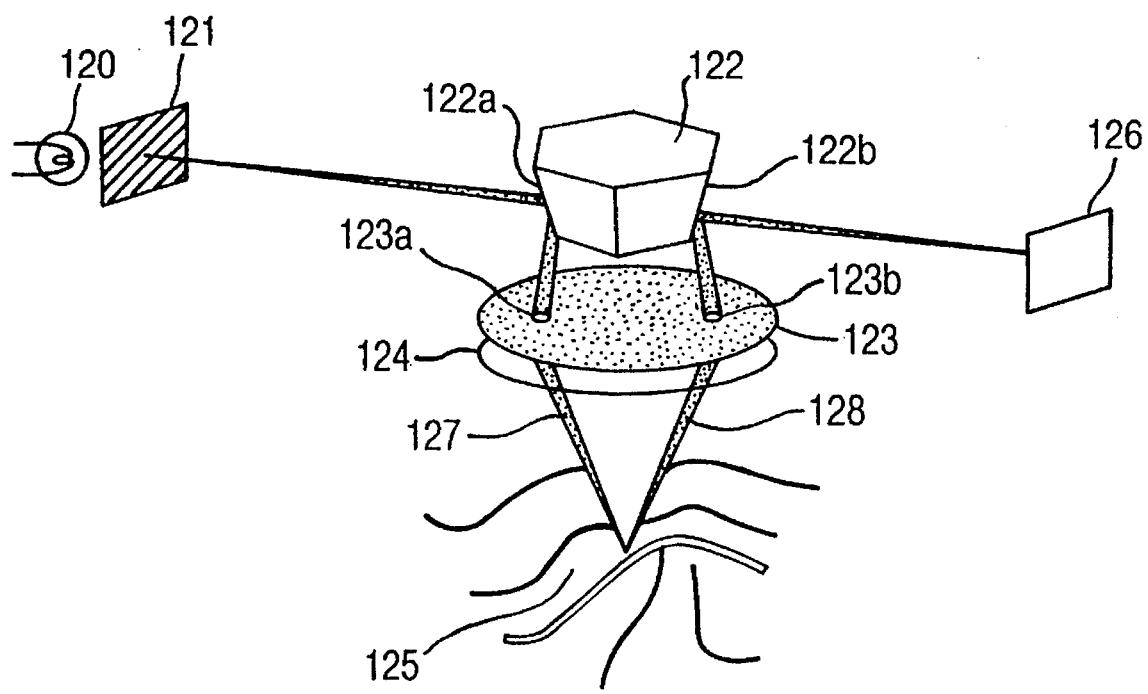
FIG. 14 is a schematic view showing the configuration of an optical three-dimensional shape measuring apparatus constituting a sixth embodiment of the present invention.

FIG. 14 is a schematic view of the configuration of an optical three-dimensional shape measuring apparatus constituting a sixth embodiment of the present invention.

The apparatus shown in FIG. 14 is provided, for example, with a strobe light source 120 as the light source, and the light therefrom is converted into the light of uniform illumination intensity by an unrepresented collimating lens and an unrepresented diffusing plate, and enters a pattern plate 121. The pattern plate 121 is composed of transparent portions and opaque portions, and the light transmitted by said transparent portions forms a predetermined irradiating pattern. Said irradiating pattern can be, for example, a pattern of spots arranged regularly in two orthogonal directions.

The patterned light transmitted by the pattern plate 121 enters an inclined face 122a of a hexagonal truncated conical prism 122, and the light reflected downwards by said inclined face 122a passes an aperture 123a of an apertured diaphragm 123, which has, as shown in FIG. 13B, two apertures along a diameter. The patterned light passing the aperture 123a is condensed by a common objective optical system 124 toward a specimen 125. The numerical aperture of said common objective optical system 124 is determined according to the desired resolving power of measurement. In this manner a projected patterned image is formed on the surface of the specimen 125.

The light from the projected patterned image formed on the surface of the specimen 125 enters, through the common objective optical system 124 and an aperture 123b of the apertured diaphragm 123, an inclined face 122b of the prism 122. The light reflected to the right by said inclined face 122b enters an image-receiving face 126 of an image pickup device such as a CCD.

In this embodiment, as explained in the foregoing, the irradiating optical system and the observation optical system have a common objective optical system 124, and the optical path 127 from the irradiating optical system to the specimen 125 and the optical path 128 from said specimen 125 to the observation optical system are independently defined by the apertured diaphragm 123.

For the purpose of simplicity, the apparatus shown in FIG. 14 has a light source and an image plane, but there may also be employed an apertured diaphragm with six apertures in the circumferential direction as shown in FIG. 13B. In such case, among said six apertures, three apertures may be used for defining three optical paths from the irradiating optical system and the other three apertures may be used for defining three optical paths to the observation optical system.

In such configuration with three light sources and three image planes, there can be projected three different patterns onto the surface of the specimen 125, and there can be conducted effective measurement by selecting an appropriate irradiating pattern, according to the local variation of the surface shape of the specimen 125.

It is also possible to project patterned lights of three different colors onto the surface of the specimen 125. For example it is possible to receive projected patterns of red, green and blue components respectively with a CCD-R for red light, a CCD-G for green light and a CCD-B for blue light.

Such patterned lights of mutually different wavelengths can form three projected patterns at slightly different focal positions, despite of the use of a common objective optical system. It is therefore possible to achieve observation with satisfactory focus state, even on a surface with significant local irregularity, by selective use of the three observation optical systems.

The patterned images of plural colors may be formed by plural light sources of mutually different colors, or by filters transmitting the lights of mutually different colors, provided in respective light paths.

Figure 15:
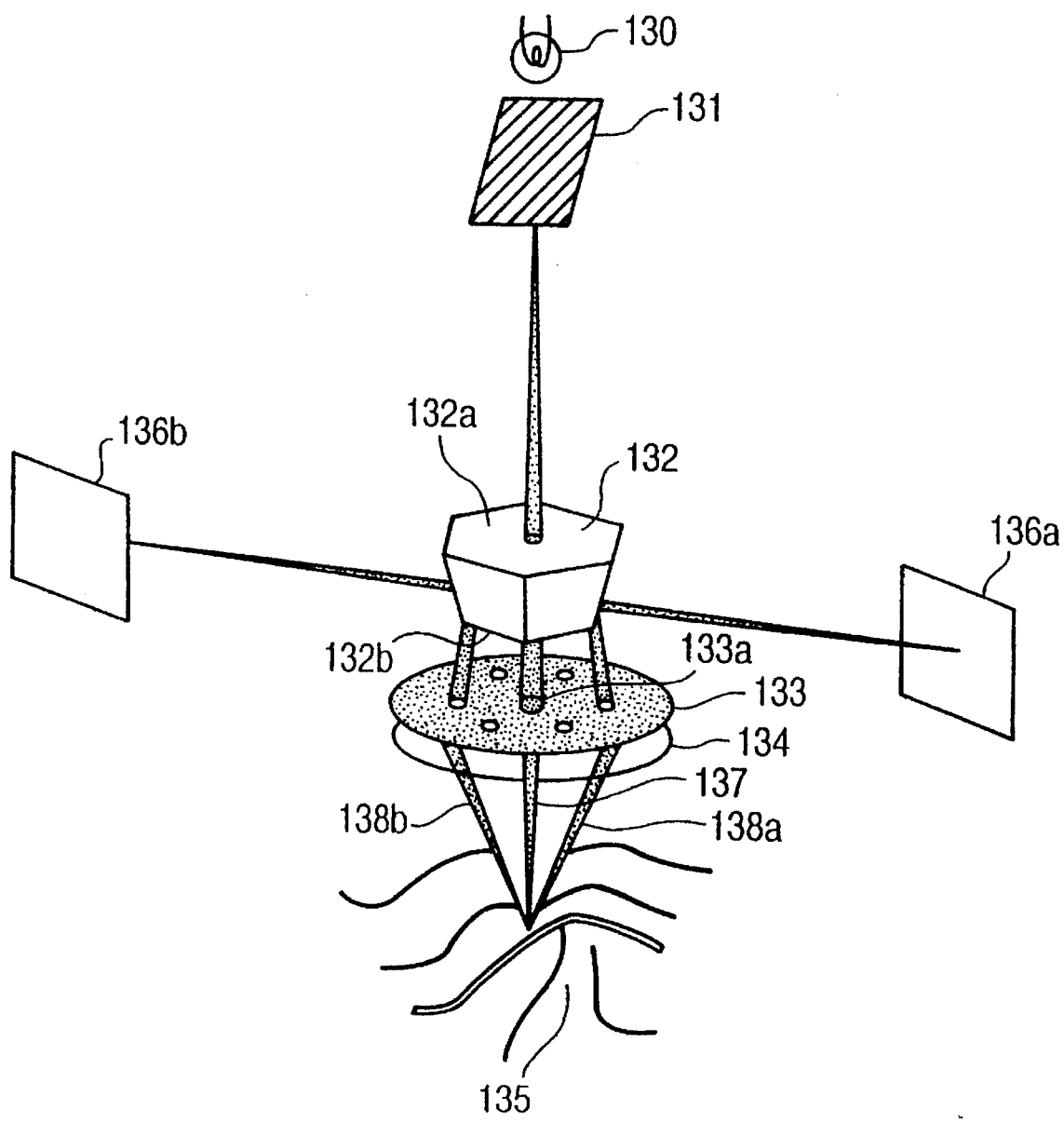
FIG. 15 is a schematic view showing the configuration of an optical three-dimensional shape measuring apparatus constituting a seventh embodiment of the present invention.

FIG. 15 is a schematic view showing the configuration of an optical three-dimensional shape measuring apparatus constituting a seventh embodiment of the present invention.

The apparatus of said seventh embodiment is similar, in configuration, to that of the fourth embodiment, but is basically different from the latter in that six observation optical systems are provided for an irradiating optical system. Components in FIG. 15, equivalent in function to those in FIG. 14 will not be explained further.

The apparatus shown in FIG. 15 is provided, for example, with a strobe light source 130. The light therefrom enters a pattern plate 131, and the light transmitted by the transparent portions thereof forms a predetermined irradiating pattern.

The patterned light transmitted by said pattern plate 131 enters a bottom face 132a of a truncated hexagonal conical prism 132, and the light transmitted by said bottom face 132a and an upper face 132b of said prism 132 passes through a central aperture 133a of an apertured diaphragm 133, which is provided, as shown in FIG. 13C, with a central aperture and six peripheral apertures. The light transmitted by the central aperture 133a is condensed by a common objective optical system 134 toward a specimen 135, whereby a projected patterned image is formed on the surface thereof. 10 The light from the projected patterned image formed on the surface of the specimen 135 is guided through the common objective optical system 134 and the six peripheral apertures of the apertured diaphragm 133, and enters the inclined faces of the prism 132. The lights reflected radially in the horizontal direction by the inclined faces of the prism 132 respectively enter six image planes 136a, 136b composed, for example, of CCD's.

In the present embodiment, the central aperture 133a of the apertured diaphragm 133 defines the optical path 137 from the irradiating optical system to the specimen 135, while the six peripheral apertures of said diaphragm 133 define the six optical paths 138a, 138b from the specimen 135 to the observation optical systems.

For the purpose of simplicity, FIG. 15 only shows two CCD's 136a, 136b and corresponding optical paths 138a, 138b while other four CCD's and optical paths are omitted.

In such configuration with a light source and six image planes, a patterned image projected on the specimen 135 can be observed from various angles through the six optical paths. Consequently, even when the surface of the specimen 135 has steep local inclination, there can be obtained reliable data of measurement at least in one of the six image planes.

In the example shown in FIG. 13C, the six peripheral apertures are arranged regularly on a circle around the central aperture, so that the distances from said peripheral apertures to the central aperture are constant. However the peripheral apertures may be provided at mutually different distances to the central aperture, in order that the inclinations of the optical paths 138a, 138b to the observation optical systems mutually vary with respect to the optical path 137 from the irradiating optical system.

Also in such case, there can be obtained further reliable data of measurement by suitably selecting the six image planes, even on the specimen surface showing various local changes.

The method of determining the surface shape of the corresponding area based on the deformation of the observed patterned image is already known as the projection pattern method, and will not, therefore, be explained further.

The foregoing embodiments employ a truncated hexagonal conical prism and show an example of forming six optical paths in total for the irradiating optical system and for the observation optical system, and an example of forming six optical paths for the observation optical system, but there may also be employed a suitable truncated polygonal conical prism according to the desired number of the optical paths.

Also in the foregoing embodiments, a prism is employed as the optical path switching means, but there may be employed other suitable optical path switching means.

Also in the foregoing embodiments, the apertured diaphragm is provided with circular apertures of a constant size, but the apertures may vary in size and/or shape. Such configuration is advantageous as the depth of focus of the object field can be modified.

Also a magnification-varying optical system may be provided in each observation optical system, whereby the observation can be achieved with a suitable variation in the magnification of the observed patterned image.

Furthermore, the principle of forming plural observation optical paths of the present invention is not limited to the optical three-dimensional shape measuring apparatus equipped with the irradiating optical system, but is likewise applicable to a two-dimensional image observing apparatus which does not require the irradiating optical system.

In the optical three-dimensional shape measuring apparatus of the present invention, as explained in the foregoing, since an objective lens is used in common, a finer projected pattern can be obtained with an objective lens of a smaller operating distance, namely of a larger numerical aperture.

Also, since the shape measurement can be conducted under the variation of at least one of the irradiating condition and the observing condition, it is rendered possible to reduce the measuring time for the entire specimen and to achieve rapid and precise shape measurement over a wide surface area in a single measuring operation.

What is claimed is:

1. An optical three-dimensional shape measuring apparatus, comprising:

an irradiating optical system for projecting a predetermined patterned image on the surface of a specimen;

an observation optical system for observing the patterned image projected on the surface of said specimen;

measuring means for measuring the surface shape of said specimen based on deviations along an image plane between said predetermined patterned image and the observed patterned image;

a common objective optical system provided in said irradiating optical system and said observation optical system; and wave front dividing means for the pupil plane of said common objective optical system for defining mutually independent optical paths from said irradiating optical system to the surface of said specimen and from the surface of said specimen to said observation optical system.

2. An apparatus according to claim 1, wherein said wave front dividing means is composed of an apertured diaphragm having a plurality of apertures.

3. An apparatus according to claim 2, comprising plural irradiating optical systems, wherein said apertured diaphragm has plural first apertures for defining plural optical paths from said plural irradiating optical systems to the surface of said specimen; and said plural irradiating optical systems are adapted to project plural mutually different patterned images onto the surface of said specimen through said plural first apertures.

4. An apparatus according to claim 3, comprising plural observation optical systems, wherein said apertured diaphragm has plural second apertures for defining optical paths from the surface of said specimen to said plural observation optical systems; and said plural observation optical systems are adapted for observing the plural mutually different patterned images, projected on the surface of said specimen, through said plural second apertures.

5. An apparatus according to claim 4, wherein said first and second apertures are disposed on a circle having a center at the optical axis.

6. An apparatus according to claim 4, wherein said plural irradiating optical systems are adapted to respectively form plural patterned images in mutually different positions with respect to said specimen; and said plural observation optical systems are adapted to observe said plural patterned images with mutually different focal positions with respect to said specimen.

7. An apparatus according to claim 2, comprising plural irradiating optical systems, wherein said apertured diaphragm has plural first apertures for defining plural optical paths from said plural irradiating optical systems to the surface of said specimen; and said plural irradiating optical systems are adapted to project plural patterned images of mutually different colors onto the surface of said specimen through said plural first apertures.

8. An apparatus according to claim 7, wherein said plural irradiating optical systems are respectively provided with light sources for generating lights of mutually different colors.

9. An apparatus according to claim 7, wherein said plural irradiating optical systems are respectively provided with filters for transmitting lights of mutually different colors.

10. An apparatus according to claim 2, wherein said apertures are variable in at least one of size and shape.

11. An apparatus according to claim 2, wherein said observation optical system further includes a magnification-varying optical system for varying the magnification of the observed patterned image.

12. An apparatus according to claim 2, wherein said apertured diaphragm is provided with a central aperture, formed at the center, for said irradiating optical system, and plural peripheral apertures, formed around said central aperture, for said observation optical systems.

13. An apparatus according to claim 12, further comprising:

a prism of a truncated polygonal conical shape having a first face, a second face, and inclined faces;

whereby light from a light source in said irradiating optical system is transmitted by said first face and said second face of said prism and projects on said specimen through said central aperture; and light from the surface of said specimen is guided through said plural peripheral apertures, reflected by said inclined faces of said prism, and enters an image plane of said observation optical system.

14. An apparatus according to claim 12, wherein said central aperture is formed about the optical axis, and said plural peripheral apertures are equally disposed on a circle about the optical axis.

* * * * *